(No Model.) 2 Sheets—Sheet 1.
A. A. HIGDEM & S. CARLSSON.
SEEDING MACHINE.
No. 470,379. Patented Mar. 8, 1892.
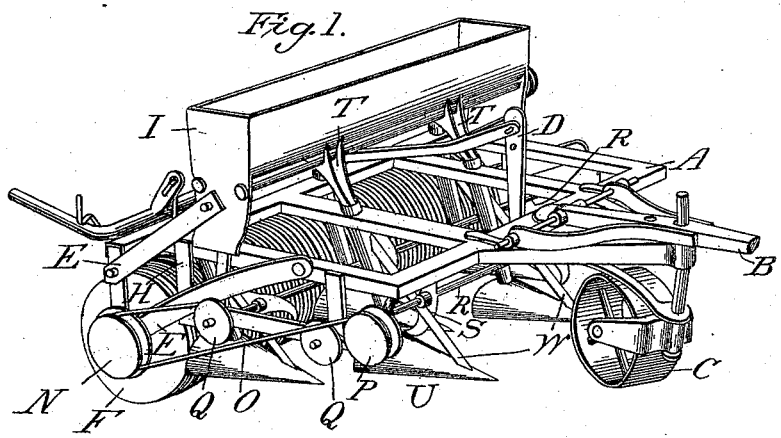
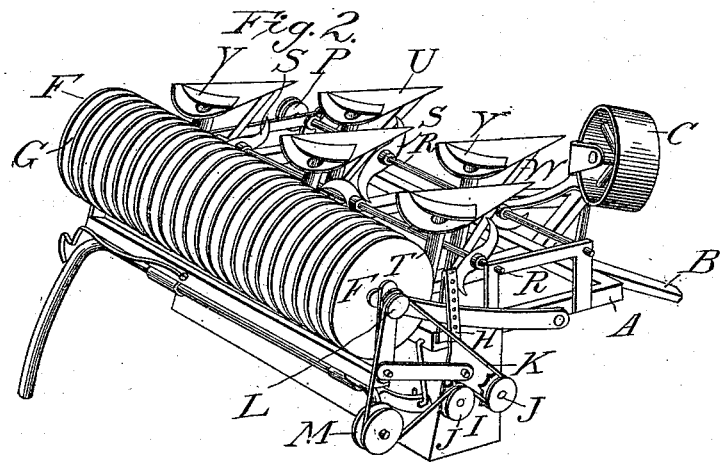
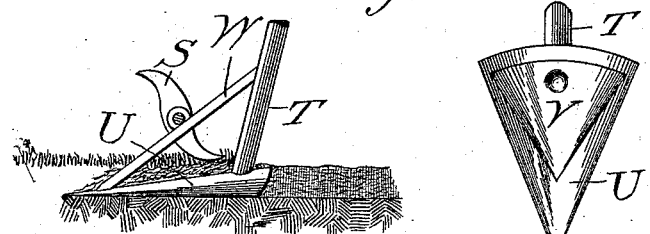
Witnesses
L. K. Hassell
J. B. Wineman
Inventors
Arne A. Higdem
Svan Carlsson

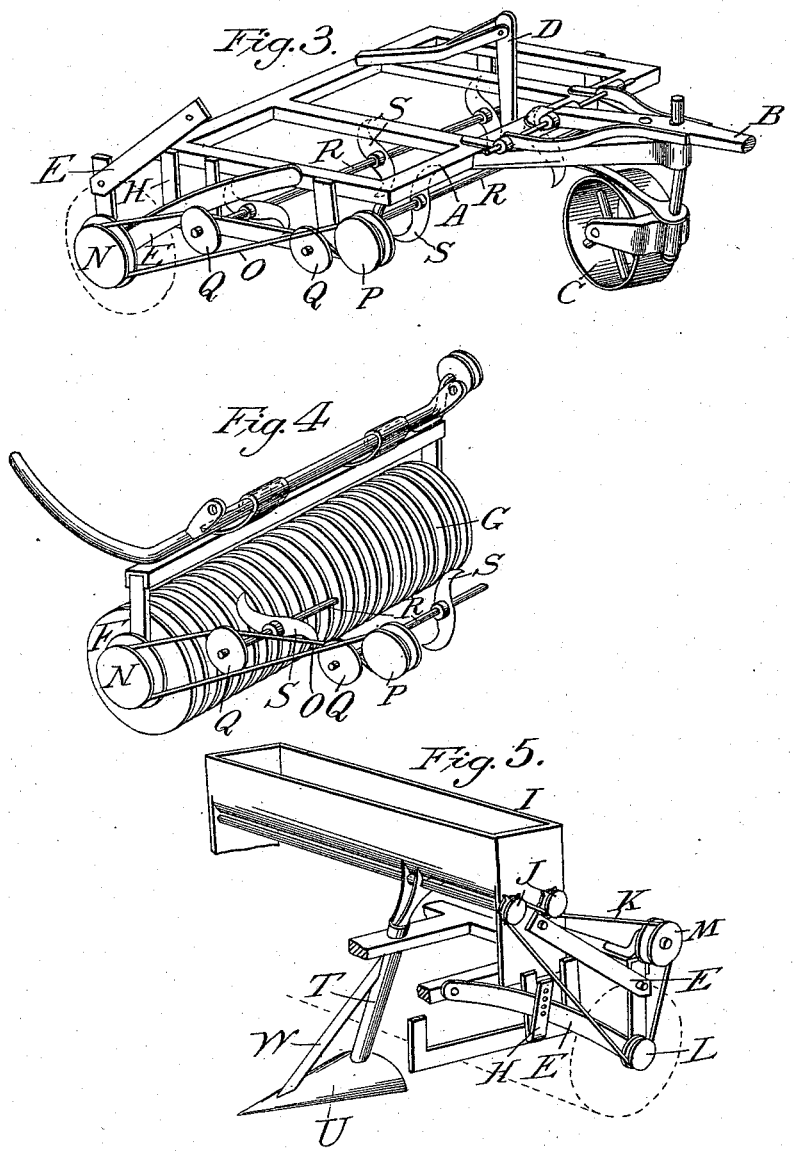

UNITED STATES PATENT OFFICE.

ARNE A. HIGDEM AND SVAN CARLSSON, OF EAST GRAND FORKS, MINNESOTA.

SEEDING-MACHINE.

SPECIFICATION forming part of Letters Patent No. 470,379, dated March 8, 1892.

Application filed June 16, 1891. Serial No. 396,532. (No model.)

*To all whom it may concern:*

Be it known that we, ARNE A. HIGDEM, a citizen of the United States, and SVAN CARLSSON, who has declared his intention to become such citizen, both residing at East Grand Forks, in the county of Polk and State of Minnesota, have invented certain new and useful Improvements in Seeding-Machines, of which the following is a specification.

Our invention aims to provide a machine by the use of which the soil will be loosened and prepared for the seed and cleared of weeds, the seed then dropped, and the soil then packed on the seed; and it consists in certain novel features hereinafter described and claimed.

In the accompanying drawings, which fully illustrate our invention, Figure 1 is a perspective view of a seeding-machine constructed in accordance with our invention. Fig. 2 is a similar view of the machine inverted. Fig. 3 is a perspective view of the frame with the hopper and roller removed. Fig. 4 is a view of the roller; and Fig. 5 is a view of the hopper, one of the seed-tubes and furrow-openers, and the gearing by which the seed-agitators are operated. Fig. 6 is a view showing the furrow-openers and seed-tubes in detail.

In carrying out our invention we employ a frame A, to the front end of which we hinge a tongue or pole B for the attachment of the team. The tongue or pole is supported upon a guiding roller or wheel C, so that the necks of the animals will be relieved of all undue strain and jolting. A lever D is provided on the upper side of the frame and is operated in the usual manner to raise the machine, so that it will run on the roller C and the presser or covering roller F at the rear end of the machine, hereinafter mentioned, and thus lift the plows and seed-tubes from the ground when the machine is being moved from field to field.

On the sides of the frame, near the rear end thereof, we pivot the brackets or bars E, in the lower ends of which we journal the presser or covering roller F, which is rifled or grooved, as shown at G, so as to form small ridges in the surface of the ground and thus protect the early-sprouting grain and prevent the escape of the moisture in the ground. A hanger H has its lower end secured to the lower bracket E and its upper end adjustably secured to the frame, so that the shares may be adjusted to enter the ground to a greater or less depth, as will be readily understood.

The hopper I is secured on the frame near the rear end of the same and contains two or more seed-agitators, which are provided at one end with pulleys or sprocket-pinions J. (See Fig. 5.) A belt or chain K passes over these pulleys and imparts motion thereto from a driving-wheel L on one end of the roller F, being held taut by passing over an idle-pulley M on the frame. At the opposite end of the roller F is a driving-wheel N, over which a chain or belt O passes. This chain or belt O passes over a supporting-pulley P near the front end of the machine and imparts motion to the pulleys Q on the ends of the rods R, which are journaled on the frame and carry the knives S, as shown. By this arrangement the said knives S will be rapidly rotated as the machine is drawn over the ground, and, as the knives are arranged in two series, which alternate, all stubble and weeds will be cut and removed from the path of the plows and seed-tubes.

The seed-tubes T extend downward and slightly forward from the hopper and are provided at their ends with the plows or furrow-openers U, which run through the ground below the surface of the same and form furrows or paths in which the seed is planted. The lower ends of the seed-tubes, it will be noticed, register with openings in the shares or furrow-openers, and just below these openings we secure to the under sides of the shares the spreading-plates V, which deflect the grain falling through the seed-tube and cause it to be planted evenly along the entire row, and also form the bottom of the furrow into a smooth surface. The shares and seed-tubes are braced by the knives or cutters W, which have their opposite ends secured, respectively, to the shares near their front ends and the seed-tubes near their upper ends. As the machine is drawn along these knives will cut through and divide the earth, so that there will be no obstruction to the passage of the seed-tubes.

From the foregoing description the operation of our improved machine will be readily understood. The seed to be planted is placed in the hopper, and the machine is then drawn over the field. As the machine passes along the motion of the covering-roller will be transmitted through the several pulleys and belts to the seed-agitators and the rotary knives, thus maintaining a constant flow of seed through the seed-tubes and causing the knives to cut away all stubble and weeds, clearing the field for the grain. The rigid knives and plows following directly behind the rotary knives form furrows, into which the seed passes, and the loose soil is thrown over and packed upon the seed by the covering-roller. It will thus be seen that we have provided a machine that is simple in its construction and by the use of which a large quantity of seed can be rapidly and efficiently planted.

The seed can be planted at any desired depth by adjusting the hanger H so as to hold the roller F at a greater or less distance below the frame, and thus permit the shares to cut into the ground at a less or greater depth.

Having thus described our invention, what we claim, and desire to secure by Letters Patent, is—

1. The combination, with the frame, of the brackets E, pivoted thereto, the roller F, journaled in the said brackets, the rotary rods R, journaled in the frame and carrying knives S, gearing connecting said rods with the roller, and the hanger H, having one end pivoted to the lower bracket and its other end adjustably secured to the frame.

2. The combination of the frame, rods R, journaled therein and carrying knives S, pulleys Q on the ends of said rods, a covering-roller F, a driving-wheel N on the end of the said roller, and a chain or belt K, passing around the driving-wheel and over the pulleys.

ARNE A. HIGDEM.
SVAN CARLSSON.

Witnesses:
NILS ERIKSON,
ANDREW ANDERSON.